Nov. 15, 1938.    H. ROSENBERG    2,136,523
SOCKET HEAD CAP SCREW OR LIKE FASTENER
Filed Jan. 26, 1937
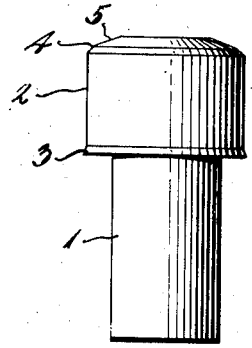
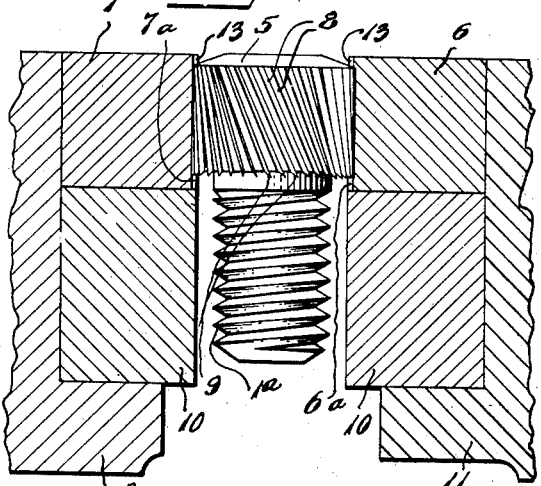
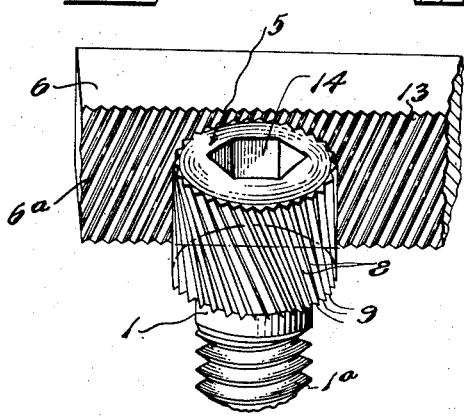
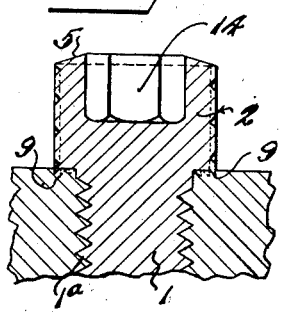
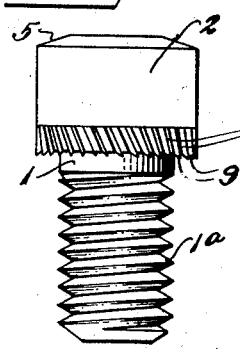
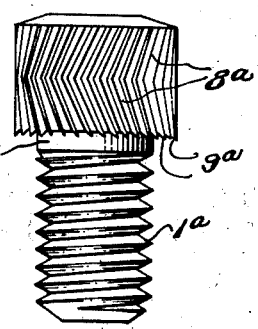
INVENTOR.
H. Rosenberg
BY
ATTORNEYS.

Patented Nov. 15, 1938

2,136,523

UNITED STATES PATENT OFFICE 2,136,523

SOCKET HEAD CAP SCREW OR LIKE FASTENER

Heyman Rosenberg, New York, N. Y.

Application January 26, 1937, Serial No. 122,456

2 Claims. (Cl. 85—9)

The present invention relates to improvements in cap screws, in particular to that type provided with a socket head, and to a novel method of producing the same.

The primary purpose of these improvements is to provide a fastener member of the type mentioned with means, forming a part of its construction, for locking against or preventing undesired unturning of the fastener once it has been turned home in the body receiving the same.

More specifically, a further object of this invention is the formation of knurls or ribs upon the face of the fastener head and as an incident thereto causing the metal to flow in a manner to form a series of teeth-like projections extending from the head in a longitudinal direction of the fastener body.

A still further objective resides in the the formation of the locking teeth, as above referred to, so that they will project from the head more or less in a general direction opposite the direction of turning movement when introducing the fastener body into its operative position, whereby any reverse or unscrewing movement of the body will tend to cause the projections to more deeply penetrate into the face of the object against which the under-face of the fastener head is pressed, thereby establishing a self-acting interlock of increasing effectiveness the greater the tendency of the fastener to unscrew for any reason.

In carrying out the foregoing objectives, I employ a novel method of construction which includes the step of forming a fastener blank with a special design of head by which excess metal will be provided in such location to furnish material for flowing into and properly shaping the locking teeth when the blank is subjected to the further step of a rolling operation between rib forming dies to form ribs on the side of the head simultaneously with extrusion of the teeth as prolongations of said ribs.

Other and further objects and advantages of the invention will be hereinafter set forth and the novel features thereof defined by the appended claims.

In the drawing:

Fig. 1 is a side elevation of a blank from which the fastener device of my invention is formed;

Fig. 2 is a view showing the blank being rolled between dies of an automatic thread-forming machine, the dies and mounting therefor being shown in section;

Fig. 3 is a perspective view of the formed cap screw and one of the rib rolling dies;

Fig. 4 is a vertical, fragmentary, sectional view showing the locking teeth or projections embedded in the face of the material into which the screw is introduced and screwed home;

Fig. 5 is a side elevation of a modified form of fastener in which the knurls or ribs are formed only on a portion of the face of the head; and Fig. 6 is a side elevation of another modification illustrating a herring-bone type of knurling rib.

Like reference characters designate corresponding parts in the several figures of the drawing.

Referring to the drawing, I designates a blank construction from which the fastener device is formed just before it is subjected to a rolling operation in a thread-forming machine. I desire it to be understood that this blank may be made in any of a number of ways, such as by a heading and rolling, stamping or milling operation. In this preliminary treatment, the face 2 of the head is given, preferably, a cylindrical shape terminating at the base in an annular angle projection 3.

It is noted that the angular shape of this flange projection is important, particularly the presentation of the sharp edge at the base of the head for reasons hereinafter pointed out. At the top portion of this face, the head is chamfered, as at 4, leading to a finishing bevel 5 at the extremity.

The blank is now placed in a conventional threading machine to form threads 1a on the shank, after which the blank is placed in the hopper of an automatic thread roller and fed into position between a pair of knurling dies 6 and 7 having upon their operating faces diagonal ribs 6a and 7a and intermediate grooves for forming corresponding ribs 8 and grooves on the face 2 of the head.

The operation of these dies is well known, die 6 being mounted in the stationary die holder 11 of the machine, while the die 7 is held in a reciprocating gate 12. Filler blocks 10 cooperate with the dies and take care of the different lengths of heads.

Movement of the gate 12 causes the blank to roll between the dies, thereby forming the knurls 8. Fig. 3 shows the finished blank in relation to the one of dies aforesaid and it will be noted that the grooves 13 in the dies are so formed that they will not only produce the knurls, but will also flow or throw down the metal of the annular projection or flange 3 into sharp pointed teeth 9 on the lower edge of the screw head due to the sharpness of the edge of the flange 3. In this connection it is to be noted that the shape and extent of these teeth are predetermined by the size and shape of the flange 3 on the preformed blank. This blank, therefore, is an important article of manufacture for the purpose of forming fastener devices of the type disclosed herein.

These teeth are so shaped and arranged by the diagonal grooves of the dies that they will act as ratchet teeth and will penetrate the material into which the bolt is introduced when the bolt is screwed home or tends to unscrew, either from vibration or any other cause. This condition is shown in Fig. 4 of the drawing. The heat treating process which the entire bolt undergoes after completion also hardens and strengthens the projecting teeth so that they are strong enough to perform this self-locking action.

In Fig. 5 a slight modification of the construction is illustrated in that the ribbing or knurling 8' of the head is produced only on the lower portion of the face of the bolt together with the teeth projections 9'. In this form of the fastener, the chamfer 4 is not provided, but in the preferred form the chamfer is important in that it prevents the formation of sharp burrs at the top of the head during the rolling.

In Fig. 6, I have illustrated another modification of the knurling which here takes the form of a herringbone 8a, the teeth 9a being present as in the other constructions.

It is to be understood that the formation of the socket 14 in the head of the screw may be done in the usual manner and at the customary stage of operation. Also the knurls may be produced at other angles than that shown herein, though it is preferable that the pitch of the ribs be from right to left so that the teeth will point rearwardly with reference to the direction of rotation of the screwing operation. Other modifications may be made without departing from the spirit of the invention and within the scope of the appended claims.

Having thus described my invention, what I claim as new and desire to secure by Letters Patent is:

1. A headed cap screw having the periphery of its head formed with diagonal knurls and penetrating points extending therefrom in a longitudinal direction from the seating face of the head.

2. A cap screw having a head and a threaded shank, said head being formed on at least on portion of its periphery with diagonal ribs extending in a direction opposite the direction of rotation of the screw and penetrating points extending from the ribs and from the seating face of the head.

HEYMAN ROSENBERG.